United States Patent
Yoo

(10) Patent No.: US 9,475,954 B2
(45) Date of Patent: Oct. 25, 2016

(54) HIGH-HARDNESS CLEAR COATING MATERIAL

(71) Applicants: HYUNDAI MOTOR COMPANY, Seoul (KR); KIA MOTORS CORPORATION, Seoul (KR)

(72) Inventor: Chang Yeol Yoo, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/709,348

(22) Filed: May 11, 2015

(65) Prior Publication Data

US 2016/0185996 A1    Jun. 30, 2016

(30) Foreign Application Priority Data

Dec. 24, 2014  (KR) .......................... 10-2014-0188010

(51) Int. Cl.
    *C09D 133/00*    (2006.01)
    *C08K 3/36*      (2006.01)
(52) U.S. Cl.
    CPC ............... *C09D 133/00* (2013.01); *C08K 3/36* (2013.01)

(58) Field of Classification Search
    CPC ............................... C09D 133/00; C08K 3/36
    USPC .................. 524/852, 849; 526/286, 289, 313
    See application file for complete search history.

(56) References Cited

U.S. PATENT DOCUMENTS 4,973,359 A * 11/1990 Yamasoe .................. C09D 5/08
                                                          106/14.13
9,127,367 B2 * 9/2015 Yamaoka ................ C23C 30/00

FOREIGN PATENT DOCUMENTS

| JP | H10-279885 A   | 10/1998 |
| JP | 4081672 B2     | 4/2008  |
| JP | 2011-110919 A  | 6/2011  |
| JP | 2012-162748 A  | 8/2012  |
| KR | 10-0804934 B1  | 2/2008  |
| KR | 10-2010-0125413 A | 11/2010 |
| WO | 81/00233 A1    | 2/1981  |

* cited by examiner

*Primary Examiner* — Kelechi Egwim
(74) *Attorney, Agent, or Firm* — McDermott Will & Emery LLP

(57) ABSTRACT

A high-hardness clear coating material capable of improving hardness and corrosion resistance of an aluminum material surface includes, in % by weight, 10 to 20% of a melamine curing agent, 10 to 15% of silica, 1 to 5% of a phenol resin, and a remainder of an acrylic resin and other unavoidable impurities.

2 Claims, 2 Drawing Sheets

*FIG. 3*

| CATEGORY | ANODIZING-TREATED POLYESTER COATING LAYER | NON-ANODIZING-TREATED POLYESTER COATING LAYER | ANODIZING-TREATED ACRYLIC COATING LAYER | NON-ANODIZING-TREATED ACRYLIC COATING LAYER |
|---|---|---|---|---|
| FLAT SURFACE | CRACK OCCURRENCE ON CLEAR LAYER | NO CRACK OCCURRENCE | CRACK OCCURRENCE ON CLEAR LAYER | NO CRACK OCCURRENCE |
| CROSS SECTION | CRACK OCCURRENCE ON CLEAR LAYER | NO CRACK OCCURRENCE | FINE CRACK OCCURRENCE ON CLEAR LAYER | NO CRACK OCCURRENCE |
| MOLDABILITY | UNSATISFACTORY | SATISFACTORY | UNSATISFACTORY | SATISFACTORY |
| SCRATCH RESISTANCE (BASE: APPEARANCE) | SATISFACTORY (FAIR) | UNSATISFACTORY (POOR) | SATISFACTORY (GOOD) | SATISFACTORY (GOOD) |

HIGH-HARDNESS CLEAR COATING MATERIAL

CROSS-REFERENCE TO RELATED APPLICATION

This application claims under 35 U.S.C. §119(a) the benefit of Korean Patent Application No. 10-2014-0188010 filed on Dec. 24, 2014, which is incorporated by reference herein in its entirety.

BACKGROUND (a) Technical Field

The present invention relates to a high-hardness clear coating material, and in particular, to a high-hardness clear coating material capable of improving the hardness and gloss of aluminum.

(b) Description of the Related Art

Technology for forming an anodizing layer (2) and a corrosion resistant coating layer (3) is currently used in order to improve the hardness and gloss of an aluminum material (1), FIG. 1. This is a technology for forming an anodizing layer (2) having high hardness through an anodizing treatment, and forming a clear corrosion resistant coating layer (3) in order to improve gloss and corrosion resistance.

Materials forming the corrosion resistant coating layer (3) include, in % by weight, 30% to 40% of a polyester resin, 20% to 30% of an isocyanate curing agent, 15% to 20% of an aromatic solvent, 15% to 20% of a cyclohexanone solvent, and 4% to 8% of a pulverized silica matting agent.

The shape of a clear coating layer according to the technology described above is shown in FIG. 1.

However, such a clear coating layer has a problem in that a corrosion resistant coating layer (3) tends to become damaged when anodizing layer (2) is brittle fractured during molding. When the anodizing layer (2) and the corrosion resistant coating layer (3) are damaged as described above, problems such as external cracks and peeling tend to occur, and corrosion develops around the damaged area.

When the anodizing layer (2) is not included, damage to the corrosion resistant coating layer (3) due to the brittle fracture of the anodizing layer (2) may be prevented; however, the corrosion resistant coating layer (3) itself cannot satisfy required hardness, and surface scratches readily occur. In addition, even when a corrosion resistant coating layer (3) having strong hardness is prepared, moldability is disadvantageously reduced, which causes end fractures and cracks to occur. These problems arise since the hardness of polyester resin, a main material of the corrosion resistant coating layer (3), is low.

Accordingly, a coating material having improved hardness and corrosion resistance thereby capable of solving such problems has been required.

The description provided above as a related art of the present invention is just for helping in understanding the background of the present invention and should not be construed as being included in the related art known by those skilled in the art.

SUMMARY

In view of the above, the present invention provides a high-hardness clear coating material without an anodizing layer, and with improved moldability.

In one aspect, the present invention exemplary embodiments of which are described, provides a high-hardness clear coating material capable of improving hardness and corrosion resistance of an aluminum material surface, the clear coating material including, in % by weight, 10% to 20% of a melamine curing agent, 10% to 15% of silica, 1% to 5% of a phenol resin, and a remainder of an acrylic resin and other unavoidable impurities.

The high-hardness clear coating material further includes, in % by weight, 10% to 15% of a cyclohexanone solvent, 5% to 10% of an aromatic solvent and 1% to 5% of a pulverized silica matting agent, wherein the content of the acrylic resin is from 40% to 50%.

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein:

FIG. 3 is a table comparing crack occurrences, moldability and scratch resistance depending on the inclusion of an anodizing treatment and components of a coating layer.

Figure 1:
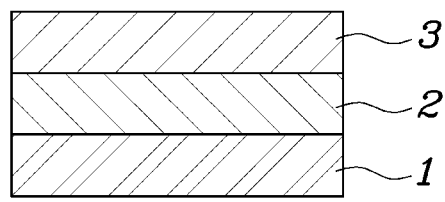
FIG. 1 is a sketch of a currently known coating layer including an anodizing layer.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF EMBODIMENTS OF THE INVENTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover the exemplary embodiments as well as various alternatives, modifications, equivalents and other embodiments; which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise specified, all terms including technical and scientific terms used herein may have the same meanings commonly understandable to those skilled in the art relating to the present invention. In addition, the terms defined in generally used dictionaries are additionally interpreted to have meanings corresponding to related technology literatures and the contents currently disclosed, and are not interpreted either ideally or officially unless clearly specially defined otherwise.

Hereinafter, a high-hardness clear coating material according to examples of the present invention will be described with reference to the accompanying drawings.

Figure 2:
FIG. 2 is a sketch of a coating layer without an anodizing layer according to one embodiment of the present invention.

As shown in FIG. 1 and FIG. 2, embodiments of the present invention described herein do not include an anodizing layer (2), and instead directly form a clear coating layer (100) on an aluminum material (1). The components of the clear coating layer (100) of the present invention as described herein are adjusted as follows in order to replenish hardness and moldability that have been insufficient in existing corrosion resistant coating layers (3).

The clear coating layer (100) of the described embodiment of the present invention includes, in % by weight, 10% to 20% of a melamine curing agent, 10% to 15% of silica, 1% to 5% of a phenol resin, and a remainder of an acrylic resin and other unavoidable impurities.

An acrylic resin is a material having both high moldability and high hardness, and when compared to a polyester resin, has somewhat insufficient moldability but superior hardness. However, acrylic resin has a disadvantage of insufficient adhesiveness for an aluminum material (1), and therefore, adhesiveness for the aluminum material may be improved through the melamine curing agent and phenol resin, and hardness may be improved through the silica. The melamine curing agent is a material having excellent moldability and adhesiveness, and is capable of being used in the present invention due to its superior moldability compared to that of an isocyanate curing agent. A content of 10% or greater of the melamine curing agent is required in order to obtain the effect of improved adhesiveness through the melamine curing agent. When the melamine curing agent is added in amount in greater than 20%, moldability is reduced, and therefore, the content is limited to 20% or less. In the case of the silica, a content of 10% or greater is required in order to expect hardness improvement. As the content increases, adhesiveness is reduced instead of improved hardness, and therefore the maximum content is limited to 15%. In the case of phenol resin, a content of 1% or greater is required in order to expect adhesiveness improvement. However, when the content is greater than 5%, moldability is reduced whereas a yellow color is developed, and therefore, the maximum content is limited to 5%.

The clear coating layer of embodiments of the present invention preferably further includes, in % by weight, 10% to 15% of a cyclohexanone solvent, 5% to 10% of an aromatic solvent, and 1% to 5% of a pulverized silica matting agent, and the content of the acrylic resin is preferably 40% to 50%.

The content of at least 40% of the acrylic resin is required in order to maintain moldability. However adhesiveness is reduced when the acrylic resin is added to excess, and therefore, the maximum content is limited to 50%. The cyclohexanone solvent is provided for dissolving the melamine curing agent, and the aromatic solvent is a solvent for dissolving the acrylic resin. The content ranges described above are required in order to dissolve the curing agent and the resin. The pulverized silica matting agent is preferably added in suitable quantities for suppressing semi-gloss.

The method of coating the coating material on the aluminum material (1) in accord with embodiments of the present invention is not particularly limited; however, using a roll coating method capable of obtaining a more flatly coated surface and suitable for mass production is preferable.

FIG. 3 shows how moldability and hardness, that is, scratch resistance, changes depending on the components of the coating material and inclusion of an anodizing treatment.

As shown in FIG. 3, moldability is insufficient when an anodizing treatment is carried out, and scratch resistance is below standard when anodizing is not included when using polyester as the material of the clear layer.

Moldability was evaluated through the occurrence of cracks or fractures after a 90 degree bending test using a V-shaped home bending tester, and scratch resistance was evaluated such that the surface was scratched using a hardness measuring ball having a diameter of 1 mm. Appearances such as thicknesses and depths of the marks were divided into grades of good, fair and poor. The acrylic coating layer, is in accord with embodiments of the present invention using the acrylic resin as a base, whereas the polyester coating layer is an existing clear coating material using polyester as a base.

The high-hardness clear coating material according to embodiments of the present invention has the following effects.

First, process time can be reduced compared to currently existing times by omitting an anodizing layer.

Second, end fractures can be prevented during pressing due to increased moldability.

Third, a thinner coating layer can be obtained.

The exemplary embodiments of the invention have been described in detail with reference to accompanying drawings; however, it will be appreciated by those skilled in the art that the invention may be carried out with other embodiments without departing from the technical ideas or basic characteristics of the invention.

Therefore, it is to be understood that the exemplary embodiments described above are for illustrative purposes only, and are not limitative of the present invention. It is to be interpreted that the scope of the present invention is defined by the appended claims rather than by the detailed descriptions, and all modifications and modified forms deduced from the meanings and scopes of the claims, and their equivalent concepts are included in the scope of the present invention.

What is claimed is:

1. A high-hardness clear coating material capable of improving hardness and corrosion resistance of an aluminum material surface, the material comprising in % by weight of the material:
   10% to 20% of a melamine curing agent;
   10% to 15% of silica;
   1% to 5% of a phenol resin; and
   a remainder of an acrylic resin and other unavoidable impurities.

2. The high-hardness clear coating material of claim 1, further comprising in % by weight of the material:
   10% to 15% of a cyclohexanone solvent;
   5% to 10% of an aromatic solvent; and
   1% to 5% of a pulverized silica matting agent, wherein the content of the acrylic resin is from 40% to 50%.

* * * * *